US00RE43792E

(19) United States
(12) Reissued Patent
Lambert et al.

(10) Patent Number: US RE43,792 E
(45) Date of Reissued Patent: *Nov. 6, 2012

(54) METHOD AND APPARATUS FOR COMPUTING A SHARED SECRET KEY

(75) Inventors: Robert Lambert, Cambridge (CA); Ashok Vadekar, Rockwood (CA)

(73) Assignee: Certicom Corp., Mississauga (CA)

( * ) Notice: This patent is subject to a terminal disclaimer.

(21) Appl. No.: 13/075,988

(22) Filed: Mar. 30, 2011

Related U.S. Patent Documents

Reissue of:
(64) Patent No.: 7,512,233
Issued: Mar. 31, 2009
Appl. No.: 11/519,207
Filed: Sep. 12, 2006

U.S. Applications:
(63) Continuation of application No. 10/058,213, filed on Jan. 29, 2002, now Pat. No. 7,127,063.

(60) Provisional application No. 60/343,224, filed on Dec. 31, 2001.

(51) Int. Cl.
*H04L 9/00* (2006.01)
*H04L 9/28* (2006.01)
*H04L 9/30* (2006.01)

(52) U.S. Cl. ..... 380/44; 380/28; 380/30; 713/169; 713/171

(58) Field of Classification Search ..... None
See application file for complete search history.

(56) References Cited

U.S. PATENT DOCUMENTS

| | | | | |
|---|---|---|---|---|
| 5,761,305 | A | 6/1998 | Vanstone et al. | |
| 5,889,865 | A | 3/1999 | Vanstone et al. | |
| 5,896,455 | A | 4/1999 | Vanstone et al. | |
| 5,987,131 | A | 11/1999 | Clapp | |
| 5,999,627 | A | 12/1999 | Lee et al. | |
| 6,122,736 | A | 9/2000 | Vanstone et al. | |
| 6,490,352 | B1 | 12/2002 | Schroeppel | |
| 7,051,200 | B1 | 5/2006 | Manferdelli et al. | |
| 7,062,044 | B1 | 6/2006 | Solinas | |
| 7,127,063 | B2 * | 10/2006 | Lambert et al. | 380/44 |
| 7,215,780 | B2 | 5/2007 | Lambert et al. | |
| 2002/0044649 | A1 | 4/2002 | Gallant et al. | |
| 2003/0123655 | A1 | 7/2003 | Lambert et al. | |
| 2005/0251680 | A1 * | 11/2005 | Brown et al. | 713/171 |

OTHER PUBLICATIONS

Möller, Bodo; "Algorithms for Multi-Exponentiation", *Selected Areas in Cryptography—SAC 2001*, Springer Verlag LNCS 2259, pp. 165-180, ISBN 3-540-43066-0.

Yen, S.-M. et al.; "Multi-Exponentiation", IEEE Proc. Comput. Digit. Tech., vol. 141, No. 6, Nov. 1994; pp. 325-326.

* cited by examiner

*Primary Examiner* — Kaveh Abrishamkar
(74) *Attorney, Agent, or Firm* — Brett J. Slaney; John R. S. Orange; Blake, Cassels & Graydon LLP

(57) ABSTRACT

A method of generating a key by a first correspondent. The key is computable by a second correspondent. The method comprises the steps of:

a) making available to the second correspondent a first short term public key;
b) obtaining a second short term public key from the second correspondent;
c) computing a first exponent derived from the first short term private key, the first short term public key, and the first long term private key;
d) computing a second exponent derived from the first short term private key, the first [long] *short* term public key, the second short term public key and the first long term private key;
*e*) computing a simultaneous exponentiation of the first exponent with the second short term public key and the second exponent with the second long term public key.

20 Claims, 6 Drawing Sheets

METHOD AND APPARATUS FOR COMPUTING A SHARED SECRET KEY

Matter enclosed in heavy brackets [ ] appears in the original patent but forms no part of this reissue specification; matter printed in italics indicates the additions made by reissue.

This application is a *reissue of U.S. Pat. No. 7,512,233, which issued from U.S. Ser. No. 11/519,207, which is a* continuation of U.S. patent application Ser. No. 10/058,213 filed on Jan. 29, 2002 now U.S. Pat. No. 7,127,063 which claims priority from U.S. Provisional Application No. 60/343,224, filed on Dec. 31, 2001 *the contents of which are incorporated herein by reference*.

BACKGROUND OF THE INVENTION

1. Field of the Invention

The present invention relates to cryptographic systems, and more particularly to a method for computing a shared secret key.

2. Description of the Prior Art

Public key cryptography is used to provide security for information transmitted over public networks. Numerous cryptographic protocols are available to provide security, integrity and authentication. Their security is based on the apparent intractability of certain mathematical problems, such as integer factorization and the discrete logarithm problem. Public key schemes sometimes require more computing power than is generally available in constrained environments. Devices such as cellular phones, pagers, and smart cards usually have limited computing power and battery power available. In such environments, elliptic curve cryptography is particularly appealing since it provides security with parameters having a smaller number of bits. Computations are correspondingly faster because of the smaller amount of data that must be manipulated. In most cryptographic systems, parameters with a larger number of bits provide greater security at the cost of speed. Accordingly, there is a continual need to optimize cryptographic operations to run as quickly as possible, to make higher security implementations of the protocols feasible.

Digital signatures are a class of cryptographic protocols used to provide authentication. As in all public key systems, a sender has a private key and a public key. The public key is made available and authenticated to other users through a certificate or a directory. The sender signs a message using their private key, and a recipient is able to verify the signature by using the authentic public key. The mathematics of the scheme provides assurance that only the owner of the private key could generate a signature that will verify using the public key.

It is often of interest to share a key between two users of a public key cryptosystem. This key can be used to secure future communications using a symmetric key cryptosystem. The MQV (Menezes, Qu, Vanstone) protocol provides a method of sharing a key between two users of a public key cryptosystem that provides authentication of the key. This protocol is described in U.S. Pat. Nos. 5,761,305, 5,889,865, 5,896,455, and 6,122,736.

The following notation is used for the MQV protocol in a group G with a generator g

| Term | Meaning |
|---|---|
| x | Alice's ephemeral private key |
| y | Bob's ephemeral private key |
| $R_A$ | Alice's ephemeral public key $g^x$ |
| $R_B$ | Bob's ephemeral public key $g^y$ |
| a | Alice's long-term private key |
| b | Bob's long-term private key |
| $Y_A$ | Alice's long-term public key $g^a$ |
| $Y_B$ | Bob's long-term public key $g^b$ |
| $s_A$ | An intermediate component of the key computed by Alice |
| $s_B$ | An intermediate component of the key computed by Bob |

An early version of the MQV protocol for sharing a key between a pair of correspondents Alice and Bob proceeds as follows in the multiplicative group of a finite field having group order q.

1. Alice selects x at random from the interval 1 to q−1.
2. Alice computes $R_A=g^x$ and sends it to Bob.
3. Bob selects y at random from the interval 1 to q−1.
4. Bob computes $R_B=g^y$ and sends it to Alice.
5. Alice computes $s_A=(x+aR_A)\bmod q$ and the shared secret $K=(R_B(Y_B)^{R_B})^{s_A}$.
6. Bob computes $s_B=(y+bR_B)\bmod q$ and the shared secret $K=(R_A(Y_A)^{R_A})^{s_A}$.

The computationally intense parts of the key agreement protocol are the exponentiations that must be performed to determine K.

When the MQV protocol was standardized in the ANSI X9.62 and IEEE P1363 standards, a truncation operation was introduced to make the protocol more efficient. The MQV protocol as standardized uses a truncation operation to reduce the bit length of an exponent. The truncation operation is denoted by $\overline{X}$ and is defined as $\overline{X}=(X \bmod 2^{80})+2^{80}$. The protocol then proceeds as follows:

1. Alice selects x at random from the interval 1 to q−1.
2. Alice computes $R_A=g^x$ and sends it to Bob.
3. Bob selects y at random from the interval 1 to q−1.
4. Bob computes $R_B=g^y$ and sends it to Alice.
5. Alice computes $s_A=(x+a\overline{R_A})\bmod q$ and the shared secret $k=(R_B(Y_B)^{\overline{R_B}})^{s_A}$.
6. Bob computes $s_B=(y+b\overline{R_B})\bmod q$ and the shared secret $k=(R_A(Y_A)^{\overline{R_A}})^{s_B}$.

The use of the truncation operation speeds up computations since the exponent is shorter. However, this means that only half of the bits of the truncated values are used. It is believed that this truncation does not affect the security of the protocol, however it is generally preferable in the design of cryptographic methods to use as many bits of the random values and private values as possible.

A version of the MQV protocol uses an elliptic curve group as the underlying group G. The group generator is normally written as a point P, and additive notation is usually used instead of multiplication notation. In the Elliptic Curve MQV protocol, the value $R_A$ is then equal to xP, and the value $R_B$ is equal to yP. Each value $R_A$, $R_B$ is thus a point on the elliptic curve. Since an elliptic curve point consists of two finite field elements, it is necessary to define a function π to convert an elliptic curve point into an integer. One typical function that is used is to interpret the bit string representing the first coordinate of the elliptic curve point as a bit string representing an integer. The component $s_A$ is equal to $s_A=(X+a\pi(R_A))\bmod q$ and the component $s_B$ is equal to $s_B=(y+b\pi(R_B))\bmod q$. The shared key may then be expressed as $K=s_A(R_B+\pi(R_B)Y_B)$. The shared key K is an elliptic curve point, and usually it will be converted into another format for use in another protocol. The conversion often involves interpreting the bit string representing K as an integer. The corresponding two point multiplications are therefore necessary to compute the shared key and are also computationally intensive.

Accordingly, there is a need for a method of computing a shared key using the MQV protocols that obviates or mitigates at least some of the above disadvantages.

SUMMARY OF THE INVENTION

In general terms, it has been recognized that the computation of the MQV shared key may be optimized by using simultaneous multiplication techniques.

In accordance with one aspect of the present invention, there is provided a method of generating a key by a first correspondent. The key is computable by a second correspondent. The method comprises the steps of:

a) making available to the second correspondent a first short term public key[.];

b) obtaining a second short term public key from the second correspondent;

c) computing a first exponent derived from the first short term private key, the first short term public key, and the first long term private key;

d) computing a second exponent derived from the first short term private key, the first [long] *short* term public key, the second short term public key and the first long term private key[.];

*e*) computing a simultaneous exponentiation of the fist exponent with the second short term public key and the second exponent with the second long term public key.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED [EMBODIES] *EMBODIMENTS*

Figure 1:
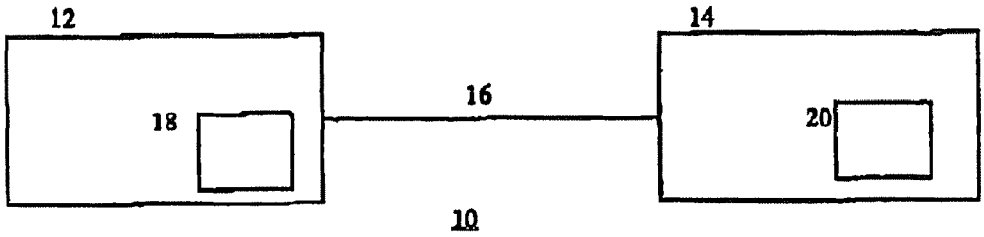
FIG. 1 is a schematic representation of a cryptographic system.

Referring to FIG. 1, a cryptographic system is shown generally by the numeral 10. A pair of correspondents 12, 14, referred to as Alice and Bob, communicate over a network 16. Each correspondent has an arithmetic logic unit (ALU) 18, 20. The ALU can be a general-purpose computer, with a cryptographic unit, which implements cryptographic protocols from instructions provided by software. The software may be provided on a data carrier or in memory. Each correspondent has a long-term private key a, b and a corresponding long-term public key $Y_A$, $Y_B$. Each correspondent has access to an authentic copy of the other correspondent's long-term public key.

It is desired to share a key between the correspondents using the MQV protocol. It is recognized that the MQV equations can be reorganized to provide efficient computations without necessarily using the truncation operation. The reorganization proceeds as follows.

The formula $K=(R_B(Y_B)^{R_B})^{s_A}$ that is used to determine the key can be rearranged as $K=(R_B(Y_B)^{R_B})^{s_A}=R_B^{s_A}Y_B^{s_AR_B}$, using the notation above. This rearrangement allows the key to be computed by using a technique known as simultaneous multiple exponentiation, which uses only one set of squares.

To compute the multiple $K=R_B^{s_A}Y_B^{s_AR_B}$, two tables of small exponents of $R_B$ and $Y_B$ respectively of a predetermined width are first established. The scalars $s_A$ and $s_AR_B$ are then examined using windows of the predetermined width. The multiples of $R_B$ and $Y_B$ corresponding to each window are retrieved from each respective table. The product of the table entries from the two windows is multiplied into an accumulator. The accumulator is then squared in accordance with the width of the window, and then the next window is examined. This process is repeated until each window has been examined, and therefore terminates with the accumulator holding the value of K.

Figure 2:
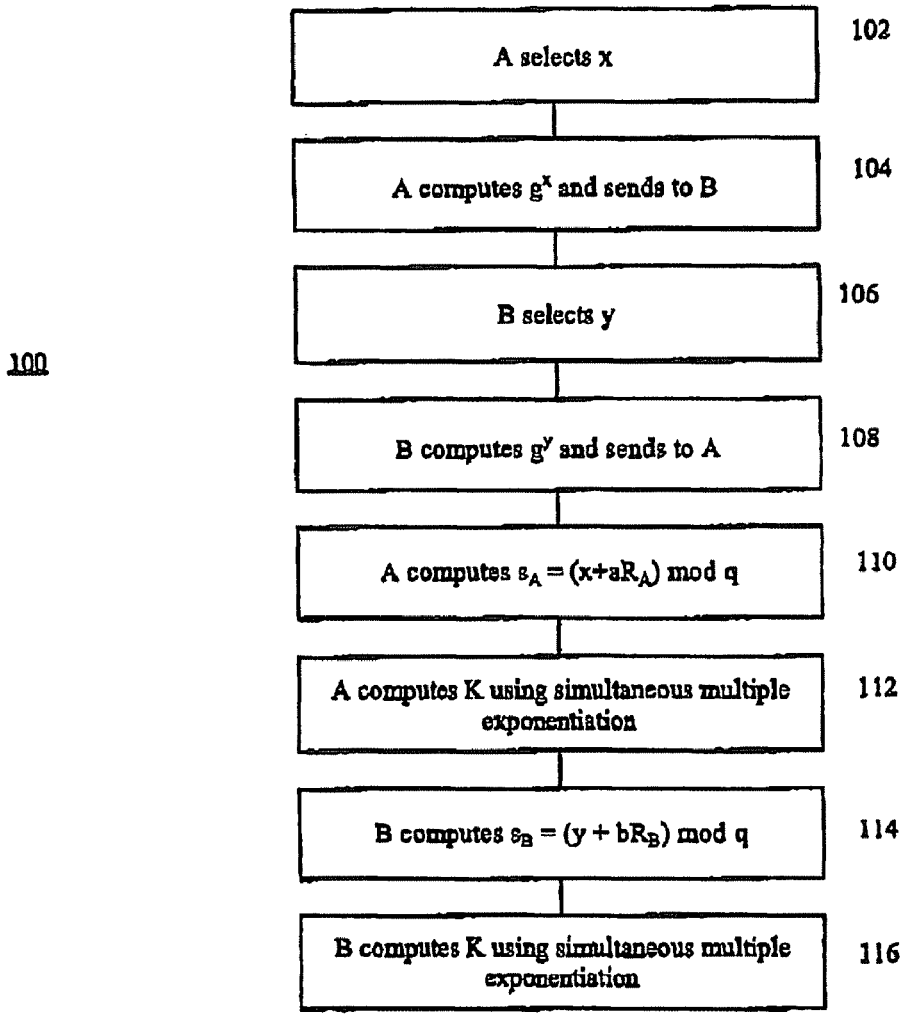
FIG. 2 is a flowchart showing a method performed by the correspondents in FIG. 1.

Referring to FIG. 2, a method of computing a shared secret key is shown generally by the numeral 100. Alice selects an ephemeral private key x at random from the interval 1 to q−1 (102). Alice computes the corresponding ephemeral public key $g^x$ and sends it to Bob (104). Similarly, Bob selects an ephemeral private key y at random from the interval 1 to q−1 (106). Bob computes the corresponding ephemeral public key $g^y$ and sends it to Alice (108). Alice computes $s_A=(x+aR_A)$ mod q and the shared secret $K=R_B^{s_A}Y_B^{s_AR_B}$ (110) using simultaneous multiple exponentiation, as described below. Bob computes $s_B=(y+bR_B)$mod q and the shared secret $K=R_B^{s_A}Y_B^{s_AR_B}$ (112) using simultaneous multiple exponentiation.

Figure 3:
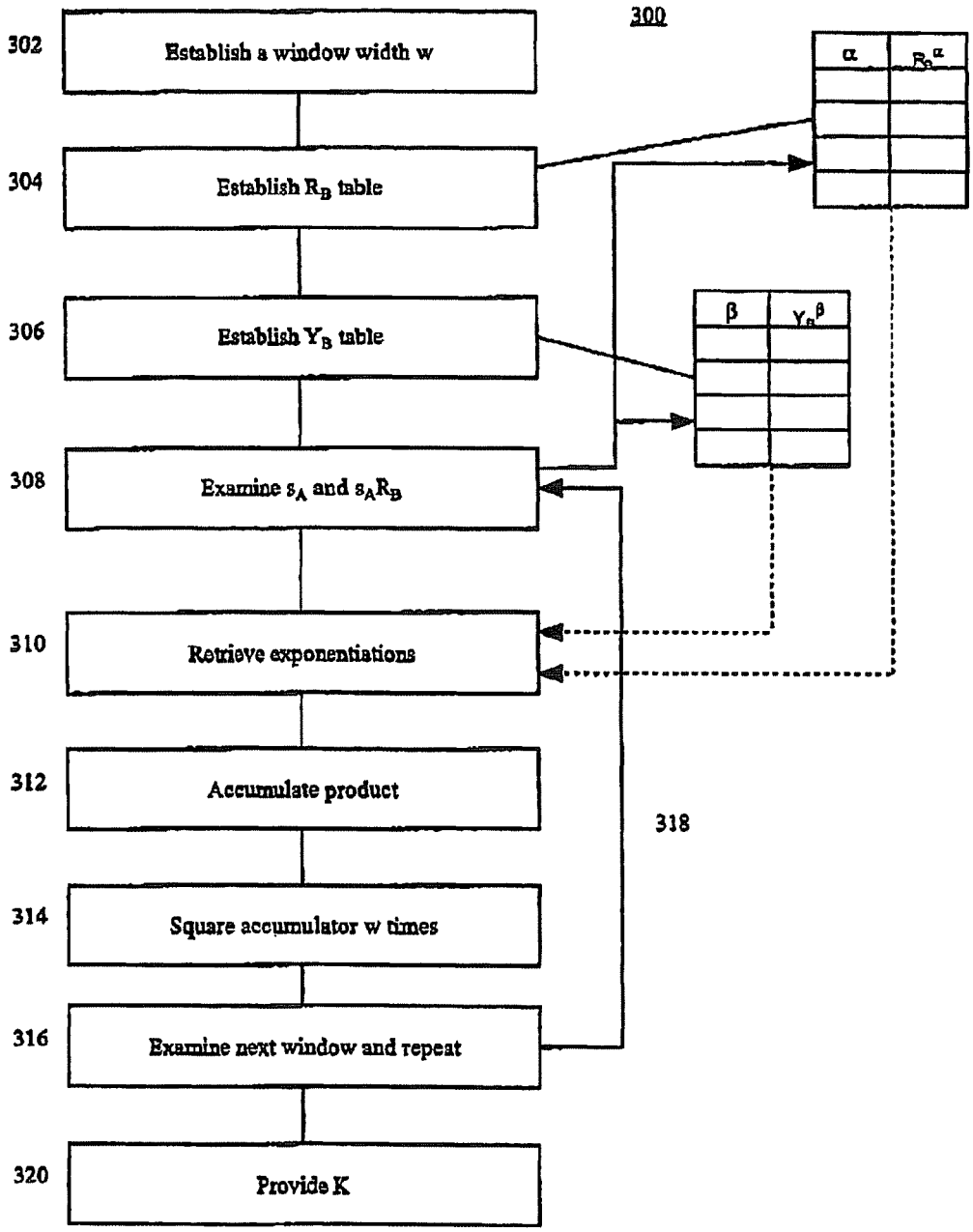
FIG. 3 is a flowchart showing a method used by the method of FIG. 2.

Referring FIG. 3, a method of computing a simultaneous multiple exponentiation is shown generally by the numeral 300. A window width of a predetermined number of bits w is first established (302). Then, a table of small [exponents α] *exponentiations* of $R_B$ is established (304) and a table of small [exponents β] *exponentiations* of $Y_B$ is established (306). The table entries consist of a column of possible bit combinations (e.g. [α=]$1001_2$), and a column of corresponding exponentiations (e.g. $R_B^{1001_2}$). Then, the scalars $s_A$ and $s_AR_B$ are examined using windows of the window width [w] *w* (308). The powers of $R_B$ and $Y_B$ corresponding to each window are retrieved from each respective table (310). The product of the table entries from the two windows is multiplied into an accumulator (312). The accumulator is then squared w times in accordance with the width w of the window (314), and then the next window is examined (316). The scalars are repeatedly examined and table entries multiplied into the accumulator and the accumulator squared w times for each repetition as described above (318) until the shared secret K is computed (320).

It will be noted that in this embodiment one simultaneous multiple exponentiation is used instead of two separate exponentiations. Accordingly, the number of squaring operations required corresponds to the number required for one exponentiation instead of that required for two separate exponentiations. It will be recognized that using the method of this embodiment, truncating the first exponent in an attempt to save squarings is not effective, since these squaring can be shared with the second multiplication. The truncation then saves only multiplications, not squarings, when applied to this embodiment since this embodiment uses simultaneous multiple exponentiation.

Figure 4:
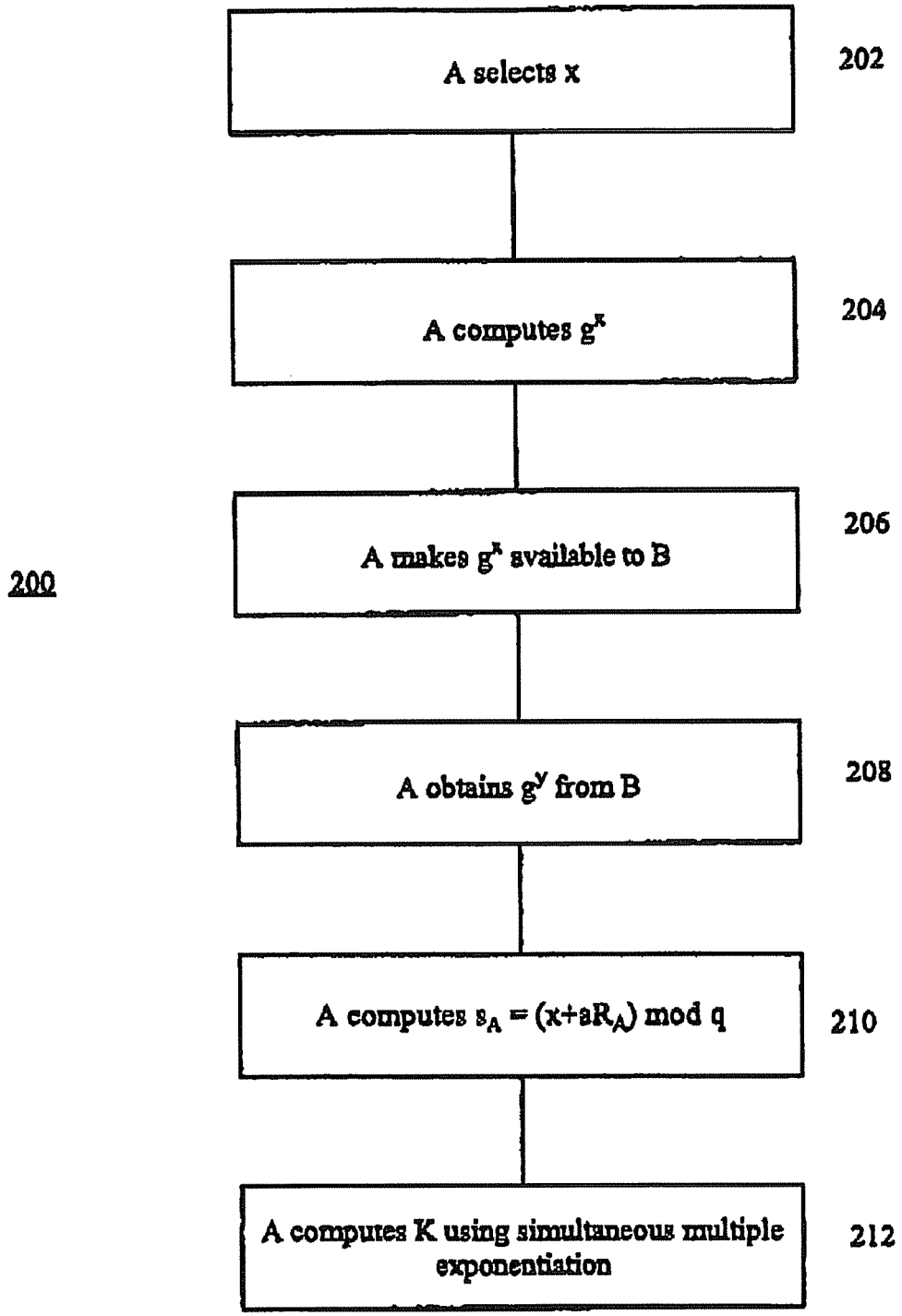
FIG. 4 is a flowchart showing another embodiment of the method of FIG. 2.

Referring to FIG. 4, an alternate embodiment is shown generally by the numeral 200. In this embodiment, Alice uses the improved method of computing the shared key, while Bob can compute the shared key by any method. Alice selects (202) x at random from the interval 1 to q−1. Then, Alice computes (204) $g^x$ and makes it available to Bob (206). Alice then obtains (208) $g^y$ from Bob. Alice computes (210) $s_A=(x+aR_A)\bmod q$ and then computes (212) the shared secret $K=R_B^{s_A}Y_B^{s_AR_B}$ using simultaneous multiple exponentiation.

Figure 5:
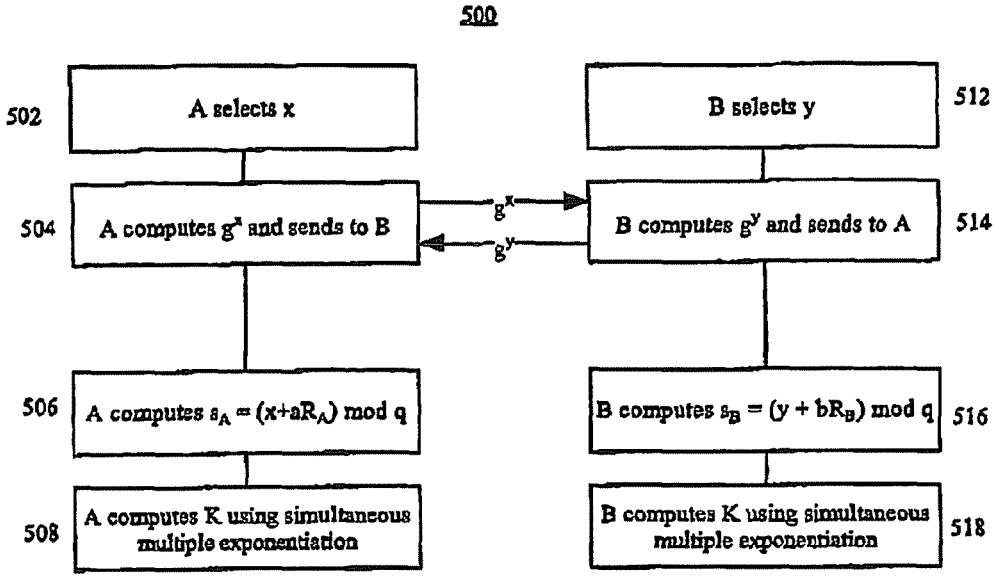
FIG. 5 is a flowchart showing yet another embodiment of the method of FIG. 2.

Referring to FIG. 5, an alternate embodiment is shown generally by the numeral 500. In this embodiment, the correspondents of FIG. 2 are shown carrying out the method in parallel. Alice selects an ephemeral private key x at random from the interval 1 to q−1 (502). Bob selects an ephemeral private key y at random from the interval 1 to q−1 (106). Alice computes the ephemeral public key $g^x$ corresponding to the ephemeral private key x (504). Similarly, Bob computes his ephemeral public key $g^y$ (514). Alice sends $g^x$ to Bob and Bob sends $g^y$ to Alice. After Alice receives Bob's ephemeral public key, she computes $s_A=(x+aR_A)\bmod q$ (506). Then Alice computes the shared secret K as before (508). After Bob receives Alice's ephemeral public key, he computes $s_B$ as before (516). Then Bob computes K as before (518). Thus, it will be understood that the order of the computations is not critical and it is only necessary that a correspondent have both its own private key and the other correspondent's, ephemeral public key before computing s and K.

Figure 6:
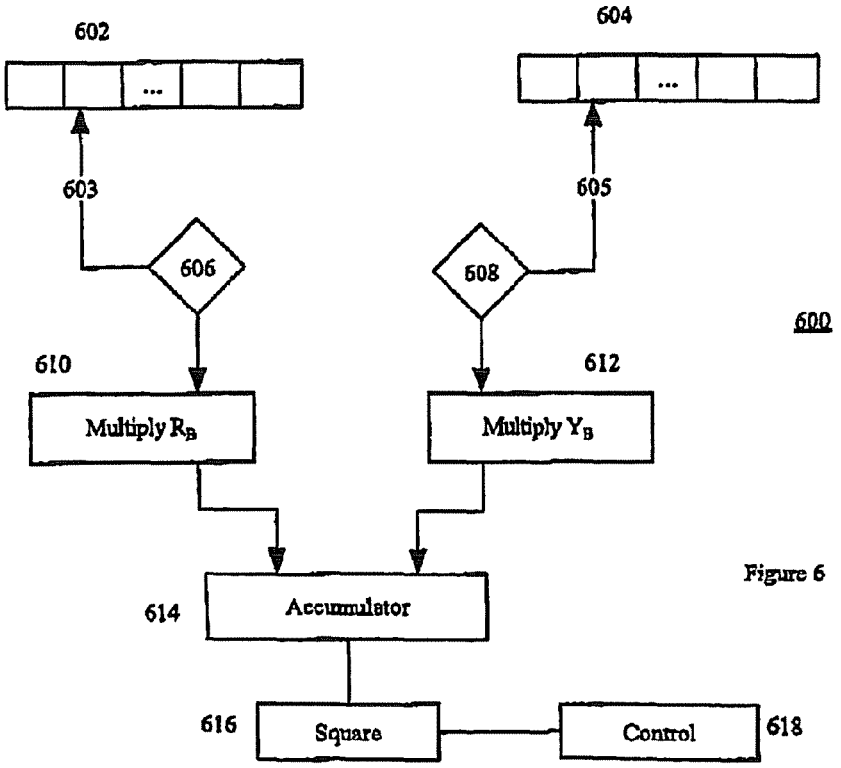
FIG. 6 is a flowchart showing an alternative method of performing the method of FIG. 3.

Referring to FIG. 6, an alternate method of computing a simultaneous multiple exponentiation is shown generally by the numeral 600. The exponent $s_A$ is shown stored in a register 602. The exponent $s_AR_B$ is shown stored in a register 604. Each register has an associated pointer 603, 605. The pointers are aligned to designate corresponding bits in each exponent. A pair of switches 606, 608 are provided. Two multipliers 610, 612 are shown, although their functionality could be performed by one multiplier. An accumulator 614, a squaring operation 616, and a control 618 are provided.

In use, the pointer 603 is an input to the switch 606 which controls multiplier 610 so that when the corresponding bit of $s_A$ is set, the quantity $R_B$ is multiplied into the accumulator 514. Similarly, the pointer 605 is an input to the switch 608 which operates the multiplier 612. The quantity $Y_B$ is multiplied into the accumulator 614 when the corresponding bit of register 604 is set. After considering each exponent, the accumulator is squared 616, and the control 618 operates to set the pointers 603, 605 to the next bits of registers 602, 604. The process repeats until all the bits have been considered. In this way, the bits of the two exponents are considered simultaneously, and only one set of squares is performed.

The above methods can be implemented in any group where the discrete logarithm problem is believed to be intractable. One example of such a group is an elliptic curve group, where the method is very similar however, the additive notation is usually used instead of multiplicative notation. In the elliptic curve setting, group multiplication corresponds to addition of elliptic curve points, and group exponentiation corresponds to scalar multiplication. In this case, the tables will contain a column possible bit combinations of the scalar (e.g. $1001_2$), and a column of corresponding point multiplications (e.g. $1001_2P$).

Figure 7:
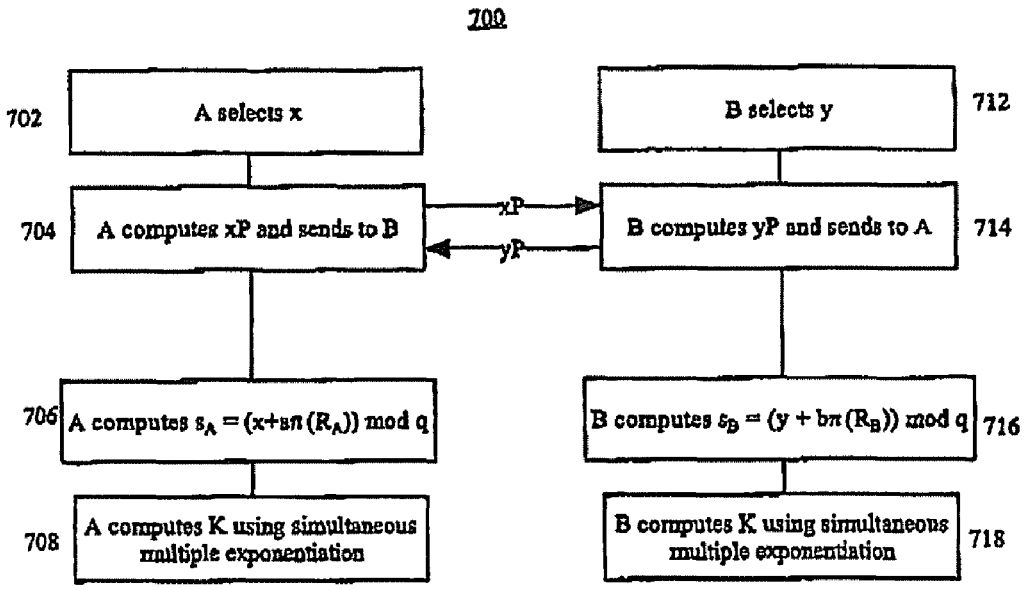
FIG. 7 is a flowchart showing another embodiment of the method of FIG. 5.
Figure 8:
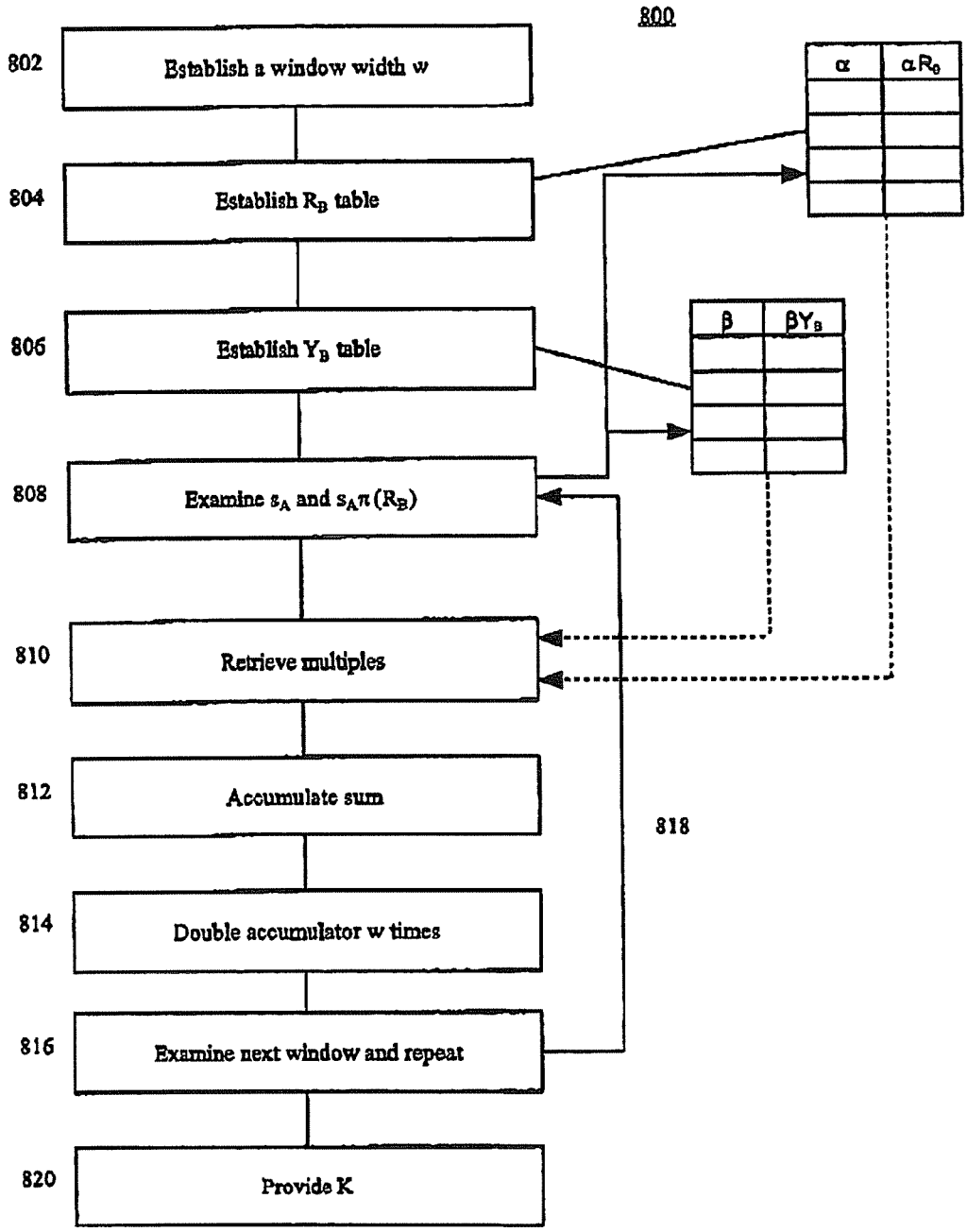
FIG. 8 is a flowchart showing a method used in the method of FIG. 7.

Referring therefore to FIG. 7, the method of FIG. 5 is shown in an elliptic curve setting by the numeral 700. The correspondents have common elliptic curve parameters comprising an elliptic curve, a finite field, a base point P of order q, and a function π to convert elliptic curve points to integers, Each correspondent has a long term private key a, b and a corresponding long term public key $Y_A=aP$, $Y_B=bP$. Alice selects an ephemeral private key x at random from the interval 1 to q−1 (702). Bob selects an ephemeral private key y at random from the interval 1 to q−1 (712). Alice computes the ephemeral public key xP corresponding to the ephemeral private key x (704). Similarly, Bob computes his ephemeral public key yP (714). Alice sends xP to Bob and Bob sends yP to Alice. After Alice receives Bob's ephemeral public key, she computes $s_A=(x+a\pi(R_A))\bmod q$ (706). Then Alice computes the shared secret $K=s_AR_B+s_A\pi(R_B)Y_B$ (708) using simultaneous multiple scalar multiplication (FIG. 8). After Bob receives Alice's ephemeral public key, he computes $s_B=(y+b\pi(R_B))\bmod q$ (716). Then Bob computes $K=s_BR_A+s_B\pi(R_A)Y_A$ (718) using simultaneous multiple scalar multiplication (FIG. 8).

Referring to FIG. 8, a method of performing simultaneous multiple scalar multiplication used in this embodiment is shown generally by the numeral 800. A window width of a predetermined number of bits w is first established (802). Then, a table of small [exponents a] *scalar multiples* of $R_B$ is established (804) and a table of small [exponents β] *scalar multiples* of $Y_B$ is established (806). The table entries consist of a column of possible bit combinations (e.g. [α=]$1001_2$), and a column of corresponding scalar multiples (e.g. $1001_2R_B$). Then, the scalars $s_A$ and $s_A\pi(R_B)$ are examined using windows of the window width [w] *w* (808). The scalar multiples of $R_B$ and $Y_B$ corresponding to each window are retrieved from each respective table (810). The sum of the table entries from the two windows is added into an accumulator (812). The accumulator is then doubled w times in accordance with the width w of the window (814), and then the next window is examined (816). The scalars are repeatedly examined and table entries added into the accumulator and the accumulator doubled w times for each repetition as described above (818) until the shared secret K is computed (820).

Although the invention has been described with reference to certain specific embodiments, various modifications thereof will be apparent to those skilled in the art without departing from the spirit and scope of the invention as outlined in the claims appended hereto.

The invention claimed is:

1. A cryptographic system for generating a shared key in [an] *a* Menezes-Qu-Vanstone (MQV) key generation protocol, said system comprising a first correspondent having a first cryptographic unit configured for:

a) making a first short term public key available to a second correspondent over a communication channel;

b) obtaining a second short term public key from said second correspondent;

c) computing a first exponent derived from a first short term private key, said first short term public key, and a first long term private key;

d) computing a second exponent derived from said first short term private key, said first short term public key, a second short term public key, and said first long term private key;

e) computing a first simultaneous exponentiation [of], *by* said first exponent [with], *of* said second short term public key and, *by* said second exponent [with], *of* a second long term public key; and f) generating said shared key using a result of said first simultaneous exponentiation.

2. The cryptographic system of claim 1 comprising a second correspondent having a second cryptographic unit configured for:

g) making said second short term public key available to said first correspondent over said communication channel;

h) obtaining said first short term public key from said first correspondent;

i) computing a one exponent derived from a second short term private key, said second short term public key, and a second long term private key;

j) computing another exponent derived from said second short term private key, said second short term public key, said second long term private key, and said first short term public key;

k) computing a second simultaneous exponentiation [of], *by* said one exponent [with], *of* said first short term public key and, *by* said another exponent [with], *of* a first long term public key; and l) generating said shared key using a result of said second simultaneous exponentiation.

3. The cryptographic system of claim 2 configured for performing a) and g) in parallel, for performing b)and h)in parallel, for performing c)and d)in parallel with i) And j), and for performing k) and l) in parallel with e) and f).

4. The cryptographic system of claim 1 wherein said first cryptographic unit is configured for performing said first simultaneous exponentiation by:

establishing a window of width w;

establishing a table of small exponentiations of said second short term public key, and a table of small exponentiations of said second long term public key to provide a series of potential exponentiations representing said first and second exponents; and examining said tables using said window w until said shared key is computed.

5. The cryptographic system of claim 4 wherein said examining said tables includes retrieving the corresponding powers of values of said second short term public key and said second long term public key within said window w, accumulating the product of corresponding entries from said tables and squaring said product w times, and examining further windows repeatedly until said shared key is computed.

6. The cryptographic system of claim 1 wherein said first cryptographic unit is configured for performing said first simultaneous exponentiation by:

storing values of said first and second exponents in first and second registers respectively, each register having an associated pointer;

using said pointers to selectively accumulate and multiply corresponding values stored in said registers; and repeatedly multiplying said values until said shared key is computed.

7. The cryptographic system of claim 1 wherein said first cryptographic unit is configured for performing elliptic curve operations.

8. The cryptographic system of claim 7 wherein said first cryptographic unit is configured for performing said first simultaneous exponentiation by performing simultaneous multiple [scaler] *scalar* multiplication using a window of width w and tables of small [exponentiations] *scalar multiples* of said second short term public key and said second long term public key.

9. The cryptographic system of claim 1 wherein said first cryptographic unit is configured for implementing cryptographic protocols from instructions provided by software, said software being stored on a memory.

10. A cryptographic unit for generating a shared key in [an] *a* Menezes-Qu-Vanstone (MQV) key generation protocol, said cryptographic unit configured for:

a) providing a first short term public key;

b) obtaining a second short term public key;

c) computing a first exponent derived from a first short term private key, said first short term public key, and a first long term private key;

d) computing a second exponent derived from said first short term private key, said first short term public key, a second short term public key, and said first long term private key;

e) computing a simultaneous exponentiation [of], *by* said first exponent [with], *of* said second short term public key and, *by* said second exponent [with], *of* a second long term public key; and f) generating said shared key using a result of said simultaneous exponentiation.

11. The cryptographic unit of claim 10 configured for performing a) in parallel with a first corresponding step performed by another cryptographic unit, for performing b) in parallel with a second corresponding step performed by said another cryptographic unit, for performing c) and d) in parallel with third and fourth corresponding steps performed by said another cryptographic unit, and for performing e) and f) in parallel with fifth and sixth corresponding steps performed by said another cryptographic unit.

12. The cryptographic unit of claim 10 wherein said cryptographic unit is configured for performing said simultaneous exponentiation by:

establishing a window of width w;

establishing a table of small exponentiations of said second short term public key, and a table of small exponentiations of said second long term public key to provide a series of potential exponentiations representing said first and second exponents; and examining said tables using said window w until said shared key is computed.

13. The cryptographic unit of claim 12 wherein said examining said tables includes retrieving the corresponding powers of values of said second short term public key and said second long term public key within said window w, accumulating the product of corresponding entries from said tables and squaring said product w times, and examining further windows repeatedly until said shared key is computed.

14. The cryptographic unit of claim 10 wherein said cryptographic unit is configured for performing said simultaneous exponentiation by:

storing values of said first and second exponents in first and second registers respectively, each register having an associated pointer;

using said pointers to selectively accumulate and multiply corresponding values stored in said registers; and repeatedly multiplying said values until said shared key is computed.

15. The cryptographic unit of claim 10 wherein said cryptographic unit is configured for performing elliptic curve operations.

16. The cryptographic unit of claim 15 wherein said cryptographic unit is configured for performing said simultaneous exponentiation by performing simultaneous multiple scalar multiplication using a window of width w and tables of small [exponentiations] *scalar multiples* of said second short term public key and said second long term public key.

17. The cryptographic unit of claim 10 wherein said cryptographic unit is configured for implementing cryptographic protocols from instructions provided by software, said software being stored on a memory.

18. A *non-transitory* computer readable medium operable with a cryptographic unit, said computer readable medium having instructions for generating a shared key in [an] *a* Menezes-Qu-Vanstone (MQV) key generation protocol, said instructions comprising instructions for:

a) providing a first short term public key;

b) obtaining a second short term public key;

c) computing a first exponent derived from a first short term private key, said first short term public key, and a first long term private key;

d) computing a second exponent derived from said first short term private key, said first short term public key, a second short term public key, and said first long term private key;

e) computing a simultaneous exponentiation [of], *by* said first exponent [with], *of* said second short term public key and, *by* said second exponent [with], *of* a second long term public key; and f) generating said shared key using a result of said simultaneous exponentiation.

19. The computer readable medium of claim 18 wherein said instructions are configured for performing said simultaneous exponentiation by:

establishing a window of width w;

establishing a table of small exponentiations of said second short term public key, and a table of small exponentiations of said second long term public key to provide a series of potential exponentiations representing said first and second exponents; and examining said tables using said window w until said shared key is computed.

20. The computer readable medium of claim 18 wherein said instructions are configured for performing said simultaneous exponentiation by:

storing values of said first and second exponents in first and second registers respectively, each register having an associated pointer;

using said pointers to selectively accumulate and multiply corresponding values stored in said registers; and repeatedly multiplying said values until said shared key is computed.

* * * * *